(12) United States Patent
Markham

(10) Patent No.: US 7,895,975 B2
(45) Date of Patent: Mar. 1, 2011

(54) PET FOOD BOWL WITH INTEGRAL PROTRUSION FOR PREVENTING ASPIRATION OF FOOD

(75) Inventor: Joseph P. Markham, Golden, CO (US)

(73) Assignee: The Kong Company, LLC, Golden, CO (US)

( * ) Notice: Subject to any disclaimer, the term of this patent is extended or adjusted under 35 U.S.C. 154(b) by 0 days.

(21) Appl. No.: 11/612,684

(22) Filed: Dec. 19, 2006

(65) Prior Publication Data

US 2008/0141945 A1    Jun. 19, 2008

(51) Int. Cl.
*A01K 1/10* (2006.01)
*A01K 5/00* (2006.01)
*A01K 5/01* (2006.01)
*A01K 39/00* (2006.01)

(52) U.S. Cl. ..................................................... 119/61.5
(58) Field of Classification Search ................. 119/61.5; 72/364; 99/428
See application file for complete search history.

(56) References Cited

U.S. PATENT DOCUMENTS

| | | | |
|---|---|---|---|
| 1,562,620 A | | 11/1925 | Dill |
| 3,349,739 A | * | 10/1967 | Griese, Jr. .......................... 72/364 |
| D246,627 S | * | 12/1977 | Sugiyama ........................ D7/359 |
| 5,113,798 A | * | 5/1992 | Rera ........................... 119/61.53 |
| 5,601,012 A | * | 2/1997 | Ellner ............................. 99/428 |
| 6,112,698 A | * | 9/2000 | Zelinger ..................... 119/61.54 |
| D478,466 S | * | 8/2003 | Henry et al. .................... D7/359 |
| D486,992 S | * | 2/2004 | Henry et al. .................... D7/359 |
| D523,185 S | * | 6/2006 | Oliphant ........................ D30/130 |
| D526,529 S | * | 8/2006 | Henry et al. .................... D7/359 |
| 2006/0005774 A1 | * | 1/2006 | Newman Bornhofen .... 119/61.5 |
| 2006/0213447 A1 | | 9/2006 | Kitchen et al. |

OTHER PUBLICATIONS

"Welcome to brake-fast.net!", brake-fast LLC, 2006 (printed on Dec. 12, 2006), available at http://www.brake-fast.net/?gclid=Clge8NvujYkCFRr7SAodP0-X3w , 1 page.
International Search Report for International (PCT) Application No, PCT/US 07/87189, mailed Nov. 21, 2008.
Written Opinion for International (PCT) Application No. PCT/US 07/87189, mailed Nov. 21, 2008.

* cited by examiner

*Primary Examiner* — Timothy D Collins
*Assistant Examiner* — Valentina Xavier
(74) *Attorney, Agent, or Firm* — Sheridan Ross, P.C.

(57) ABSTRACT

A pet food bowl is provided with an integral protrusion that helps to prevent inadvertent aspiration of food by the animal. Particularly for dogs, some feeding behaviors are characterized by swallowing large amounts of food. The protrusion in the bowl separates the food into a peripheral channel within the bowl, and the dog therefore cannot simultaneously secure large amounts of food into its mouth. The protrusion is centrally oriented and extends from the base of the bowl, thereby causing the food to be uniformly distributed within the channel.

8 Claims, 2 Drawing Sheets

PET FOOD BOWL WITH INTEGRAL PROTRUSION FOR PREVENTING ASPIRATION OF FOOD

FIELD OF THE INVENTION

The present invention relates to pet food bowls, and more particularly, to a pet food bowl with an integral protrusion to help prevent aspiration of food by an animal whose feeding behavior may be normally characterized by swallowing large amounts of food.

BACKGROUND OF THE INVENTION

Domesticated animals to include dogs may have feeding behaviors characterized by the swallowing of large amounts or hunks of food. Some of this behavior may be attributed to instinct, while some of the behavior may be attributed to the particular breed of dog and the environment in which the animal is fed. Additionally, a dog that swallows large amounts of food may be a function of how the dog is fed, it being understood that some pets are allowed to "free feed" while other animals are fed at regimented times during the day.

One problem associated with animals who swallow large amounts of food is that this particular feeding behavior makes the animal much more prone to aspirating some portion of the food. In some cases, the aspiration can be fatal. Aspirating a particularly large chunk of food may completely block the animal's airway, or may cause the animal to uncontrollably cough that can cause damage to the animal's heart and lungs, and then lead to serious injury or death.

For some breeds of dogs, the problem of aspirating food is compounded because the animal by instinct will swallow large amounts of food, and there are very few training techniques that are available to successfully prevent an animal from acting out this feeding instinct.

Because pet food bowls are typically open, foreign objects may inadvertently be dropped or carried into the pet food bowl. If a foreign object is covered with food, the animal may inadvertently choke on or aspirate the foreign object. Thus, further complications may arise from an animal's natural feeding habits.

While the small, dried, nugget-shaped type of dog food is less prone to be aspirated by an animal, many pet owners still purchase canned pet food and/or supplement the animal's diet with human food which may not be adequately cut into small pieces and remains in large chunks. Thus, under various circumstances, it is possible for an animal to gulp a large quantity of food and thus aspirate some portion of the food.

Because of the problem associated with aspirating food and the additional problem of choking on a foreign object mixed in the food, there is a need to provide a device that helps to prevent the animal from inadvertently aspirating the food, thereby controlling the feeding behavior of the animal. There is also a need to provide such a device that can be easily integrated with a standard feeding bowl used by pet owners

SUMMARY OF THE INVENTION

In accordance with the present invention, a pet food bowl is provided that has an integral protrusion to prevent an animal from inadvertently aspirating large chunks of food during feeding. In a preferred embodiment of the present invention, the pet food bowl includes a centrally oriented protrusion that directs the food into a channel or recess that extends around an inner periphery of the bowl. This channel or recess is preferably sized such that the animal's mouth can fit within the channel or recess, but since the food is distributed in the channel, the animal is prevented from simultaneously gathering a large amount of food in the mouth.

The central protrusion preferably has a curved or rounded configuration such that food is directed by gravity into the peripheral channel or recess. The central protrusion also serves as an obstacle to prevent the animal's mouth from accessing the entire channel of the bowl without movement of the animal; either movement of the orientation of the animal's head and/or movement of the animal's body. The size of the protrusion and channel as well as the size of the particular animal primarily dictate the amount of required movement by the animal to access all locations of the channel.

In a preferred embodiment of the present invention, the central protrusion may have an irregular compound curved shape. In the particular embodiment illustrated with the present invention, the curved shape of the protrusion corresponds to the pet toy shape for the Kong® dog toy. Coincidentally, this particular pet toy shape has a plurality of convex curved surfaces which therefore direct the food into the peripheral channel of the bowl.

Further features and advantages of the present invention will become apparent from a review of the drawings, taken in conjunction with the detailed description.

DETAILED DESCRIPTION

Figure 1:
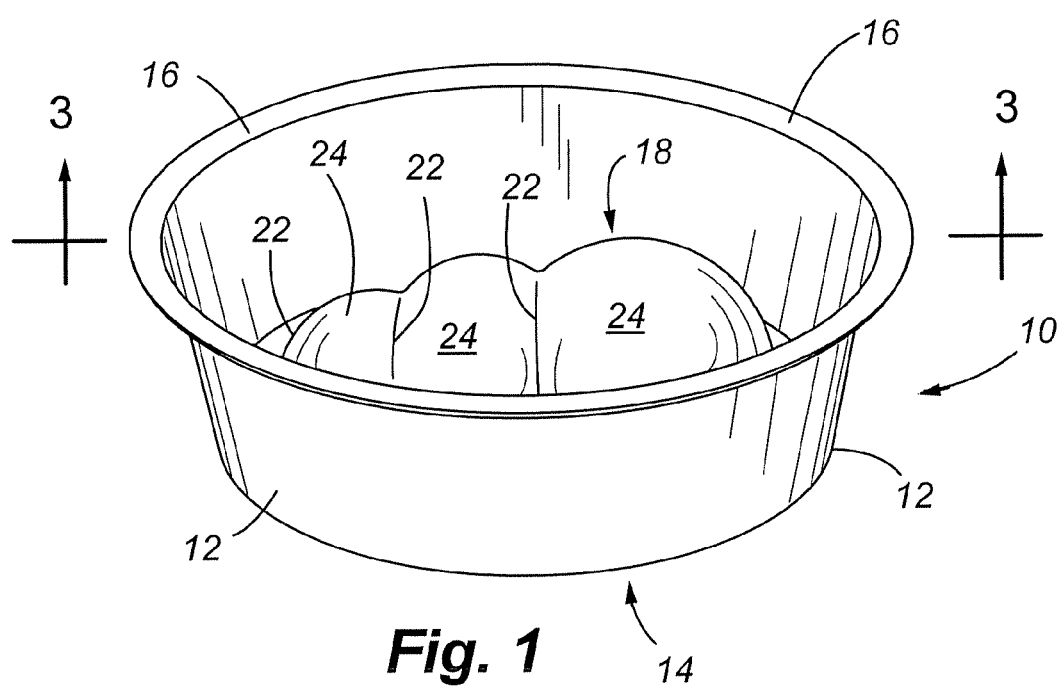
FIG. 1 is a perspective view of the pet food bowl in accordance with a preferred embodiment of the present invention.
Figure 2:
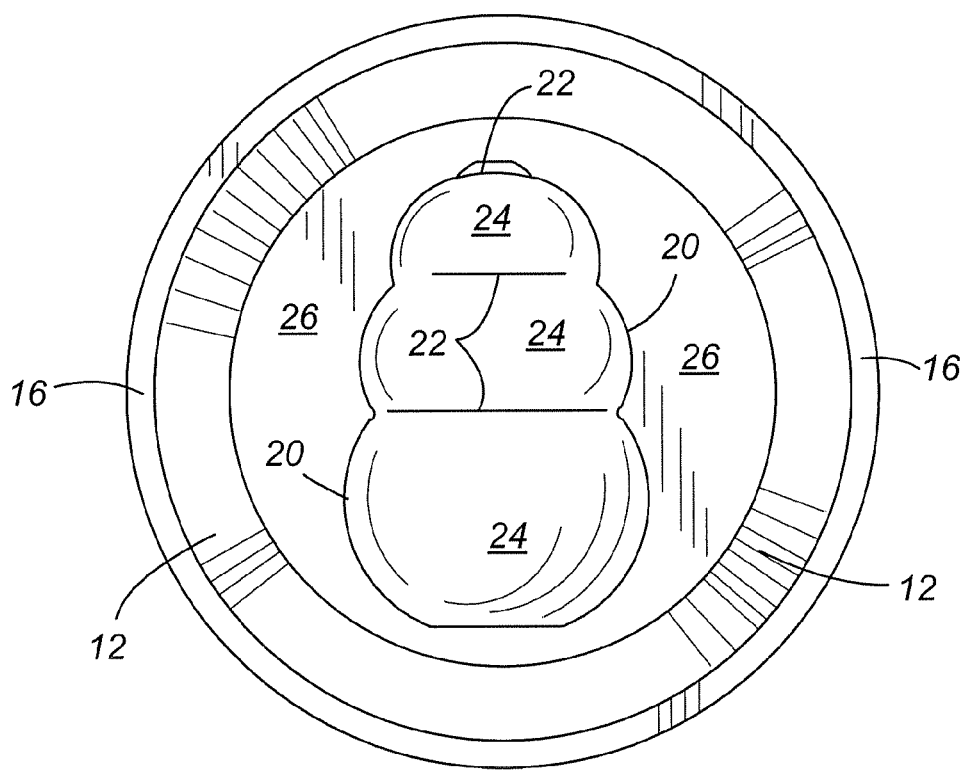
FIG. 2 is a plan view of the pet food bowl.
Figure 3:
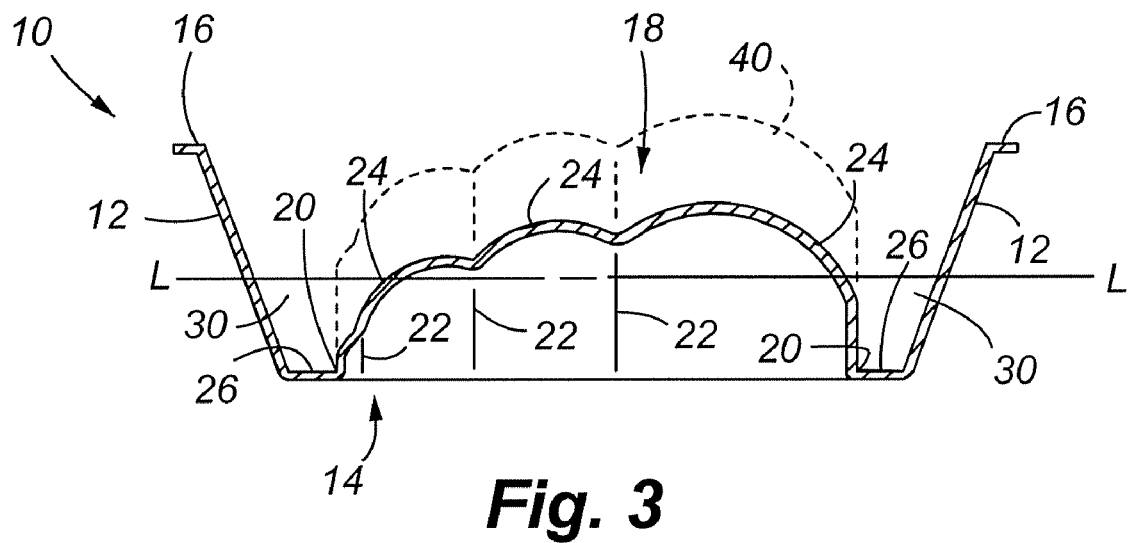
FIG. 3 is a vertical section taken along line 33 of FIG. 1.

FIGS. 1 and 2 illustrate a preferred embodiment of the present invention. The pet food bowl 10 comprises a circular side wall 12, a flat base 14, and a lip 16 defining an upper edge of the side wall. A central protrusion 18 extends from the base 14. Referring also to FIG. 3, the points along the protrusion 18 that connect to the base 14 can be defined as the interface line or intersection line 20. The protrusion 18 includes a plurality of curved areas 24, and a plurality of separating features 22 spaced between the curved areas 24. As shown, the separating features 22 form depressions between the curved areas 24. As shown, the separating features 22 are vertically oriented at their opposing ends that extend to the base 14. The protrusion 18 has a generally convex shape and is curved along its exterior surface, thereby channeling food into a peripheral channel or recess 30 that is defined as the gap or space between the protrusion 18, the interior side of side wall 12, and the bottom or lower surface 26 of the interior of the bowl. In the preferred embodiment as shown, the convex sloping shape of the protrusion extends from a center area of the protrusion, including covering the geometric center of the bowl, outwardly towards the peripheral channel as the protrusion approaches the intersection line 20. This outwardly diverging convex shape as mentioned above helps to direct the food into the peripheral channel.

In FIG. 3, the most upper portion of the protrusion 18 is inset within the bowl and does not extend above the lip 16. However, it shall be understood that the particular size of the central protrusion 18 can be modified to create a desired sized peripheral channel 30, to include a channel having a desired width and depth. Thus, it is also contemplated that the central protrusion 18 could also extend above the lip. The peripheral length or circumference of the channel 30 may also be modified by changing the particular size of the bowl, it being understood that a larger bowl allows incorporation of a channel with a greater circumference. One way in determining the optimal size and spatial configuration of the channel and protrusion is to consider the average feeding allowance of the animal for the day. Taking this amount of food, the channel and protrusion can be sized such that this amount of food can be placed in the channel such that the upper level of the food does not extend above the most upper part of the protrusion. In this way, the food remains distributed in the bowl along the channel and no significant part of the food is available for the animal to consume in a single gulp or mouthful.

Referring to FIG. 3, it is therefore desirable to not fill the bowl above the line L-L so that substantially all of the food is directed into the channel 30. If the bowl in FIG. 3 is completely filled with food, then at least some of the food will reside above the channel, and the animal therefore can potentially swallow a large amount of food in a single gulp.

If it were desirable to create a different sized channel in the same sized bowl, then as shown in dotted lines 40 in FIG. 3, the central protrusion could be made larger, yet the overall convex shape maintained to direct the food into the peripheral channel 30. As shown in FIG. 3, the larger central protrusion 40 is still centrally oriented within the bowl, but creates a peripheral channel 30 having a greater depth.

It is also shown in FIG. 3 that the side wall 12 extends at an angle from the base 14. It should be understood that this particular angle may be adjusted in order to create the particular depth and width of the channel best suited for the particular animal and the type of food being fed to the animal.

It is also noted in the preferred embodiment as shown that the area of the bottom surface occupied by the central protrusion exceeds the area of the bottom surface occupied by the peripheral channel. It is not required that this relationship be maintained for use of the invention with all animals however the relatively large central protrusion enables the food to be uniformly distributed in the peripheral channel and thus only one protrusion is required to achieve the purpose of slowing the rate at which the animal feeds. It should also be understood that while the preferred embodiment illustrates a unique shaped convex protrusion, other curved protrusions can be provided such as one or a plurality of interconnected spherical protrusions or other shaped protrusions that are centrally oriented in the bowl and create the peripheral channel.

Figure 4:
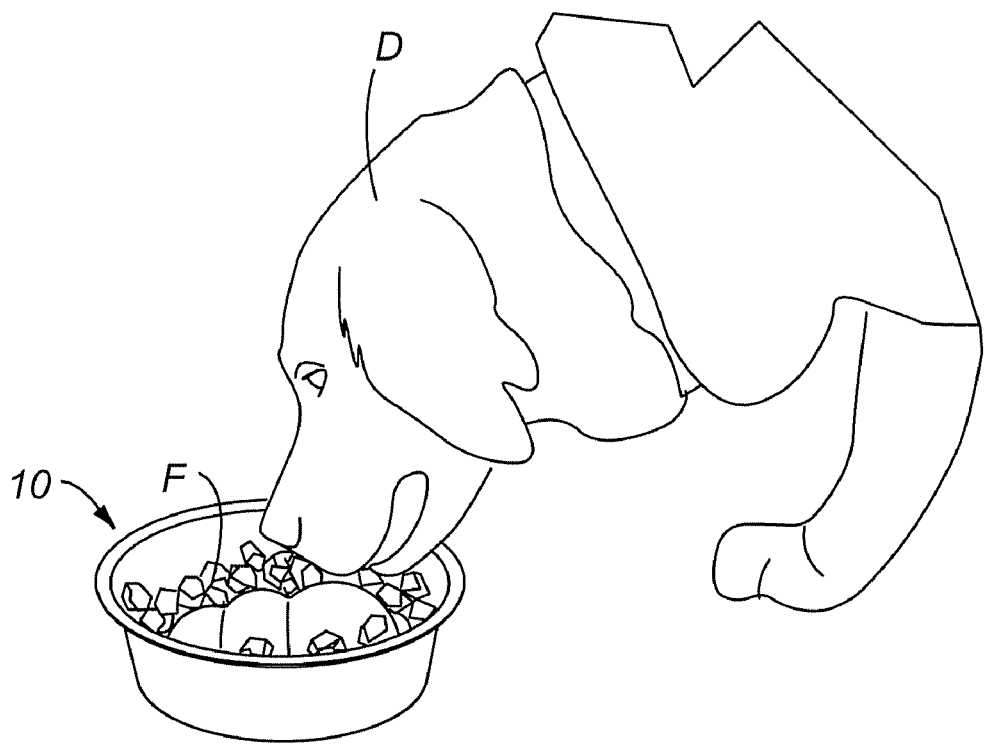
FIG. 4 is a perspective view illustrating a dog feeding from the pet food bowl.

Referring to FIG. 4, a dog D is shown feeding. The food F is found in the channel 30 and the protrusion 18 extends above an upper level of the food F. As the dog feeds, the dog must spend additional time in making contact with the food since the food is found within the channel. Most likely, not only will the dog have to change the orientation of its head to access the channel, but the dog will also have move its body to a different position. For an optimum channel size, consideration may also be taken with respect to the size and shape of the animal's face. For a dog with a long face, the channel can be made deeper and for a dog with a short face, the channel can be made shallower. Examples of dogs having relatively long faces include German Shepherds and Cocker Spaniels. Examples of dogs having shorter faces include Pekingese and Pugs. The pet food bowl of the present invention is easily adaptable for provision of an optimum sized channel for very different types of dogs.

Depending upon the size of the dog, the particular feeding behavior of the animal, and the type of food provided to the animal, the particular size of the central protrusion can be adjusted to appropriately configure the width and depth of the channel. For example, if a pet owner has a very small dog with a particularly bad feeding habit where food is commonly gulped in large quantities, then the channel 30 could be made very narrow and deep to cause the animal to spend a substantial amount of additional time to consume the animal's food. On the other hand, another dog that does not show such an extreme feeding behavior may only require a central protrusion that breaks up the portion of food administered into a few groups along the periphery of the bowl.

It is also preferable to provide a central protrusion having a size large enough and with curved surfaces such that the protrusion is not conducive for the animal to bite and thereby tip or turn the bowl over in an attempt to reach the bottom of the channel. A relatively small protrusion or a plurality of smaller protrusions are not preferred since these protrusions may allow the animal to easily bite and tip the bowl, and such protrusions may also present a hazard to the animal by the protrusion(s) repeatedly contacting the eyes, lips and/or nose of the animal during feeding.

The pet food bowl of the present invention may be made from conventional materials to include plastic and metal. Because of the relatively simple convex-shaped central protrusion, such a shape can be incorporated in common manufacturing techniques to include the various molding techniques that may be currently used in making pet food bowls from both metal and plastics.

Because the peripheral channel extends around the periphery of the bowl, in order for the animal to eat all of the food in the bowl, the animal's mouth must traverse at least a major portion of the periphery of the bowl. This movement of the animal's mouth is most easily accomplished if the animal at some point in time during the feeding process moves its body location. The movement of the animal during the feeding also assists in slowing the rate at which the animal feeds and thereby helps to prevent inadvertent aspiration.

The central protrusion adds some structural stability to the base of the bowl and particularly for plastic pet food bowls, this added structural strength may contribute to increased life of the bowl.

From the preferred embodiment illustrated, it is noted that a surface area of the central protrusion may exceed the surface area of the bottom surface of the bowl in order to create a channel small enough to limit animal access. Alternatively, the protrusion can be conceptually viewed as reducing the surface area of the bottom surface. Also, the channel does not have to have a uniform width as shown in FIG. 2 wherein a compound shaped protrusion may result in a non-uniform shaped channel.

Although the foregoing invention has been illustrated with respect to a preferred embodiment, it shall be understood that various changes and modifications may be made to the invention in accordance with the scope of the claims appended hereto.

What is claimed is:
1. A bowl comprising:
a side wall having a height;
a base connected to said side wall;
a central protrusion extending from the base and upwards at least halfway along said height of said sidewall, said protrusion dividing a bottom surface of the base within the bowl into a peripheral channel bounded by said sidewall, said protrusion having at least one curved surface that directs food placed in said bowl toward said peripheral channel;
said central protrusion is centrally oriented in said bowl, and said protrusion includes a plurality of convex curved areas joined to one another at a height above the bottom surface and forming a continuous raised area above the bottom surface, one of said convex curved areas located over a center of the bowl, and a plurality of separating features forming depressions for separating said curved areas; and wherein a first area of the bottom surface occupied by the central protrusion exceeds a second area of the bottom surface occupied by the peripheral channel.

2. A bowl, as claimed in claim 1, further including a lip formed on a peripheral upper edge of said side wall.

3. A bowl, as claimed in claim 1, wherein:

said side wall has a height, and said protrusion extends above said bottom surface but below said height of said side wall.

4. A bowl, as claimed in claim 1, wherein:

said protrusion reduces a surface area of said bottom surface by at least fifty percent.

5. A bowl, as claimed in claim 1, wherein:

said channel is sized to receive food with particle sizes small enough to fit in said peripheral channel and rest on said bottom surface.

6. A bowl, as claimed in claim 1, wherein:

said protrusion has a convex sloping shape.

7. A bowl, as claimed in claim 6, wherein:

said convex sloping shape extends outwardly towards said peripheral channel as said protrusion approaches an intersection with said base.

8. In combination, a bowl comprising:

(a) a bowl including:

a sidewall;

a base connected to said sidewall;

a central convex protrusion extending from the base, said protrusion dividing a bottom surface of the base within the bowl into a peripheral channel, said protrusion being centrally oriented in said bowl and having a portion thereof located over a center of the bowl, and said protrusion having a convex sloping shape extending from a center area of the protrusion outwardly towards the peripheral channel thereby forming an outwardly diverging convex shape, said central protrusion including a plurality of curved areas and a plurality of separating features forming depressions between the curved areas, said plurality of curved areas each extending above the bottom surface and joined to one another at a height above the bottom surface and forming a continuous raised area above the bottom surface; and (b) food placed in said bowl and residing within said peripheral channel.

\* \* \* \* \*